United States Patent
DeLorme, Sr. et al.

(10) Patent No.: US 8,826,355 B2
(45) Date of Patent: Sep. 2, 2014

(54) SYSTEM AND METHOD FOR RECORDING A MULTI-PART PERFORMANCE ON AN INTERNET PROTOCOL TELEVISION NETWORK

(75) Inventors: David B. DeLorme, Sr., Stone Mountain, GA (US); James Carlton Bedingfield, Lilburn, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 989 days.

(21) Appl. No.: 12/433,351

(22) Filed: Apr. 30, 2009

(65) Prior Publication Data

US 2010/0281503 A1  Nov. 4, 2010

(51) Int. Cl.
- *H04N 7/173* (2011.01)
- *G06F 3/00* (2006.01)
- *G06F 13/00* (2006.01)
- *H04N 5/445* (2011.01)

(52) U.S. Cl.
USPC .............. 725/109; 725/40; 725/110; 725/115

(58) Field of Classification Search
CPC .................. G10H 2240/175; H04N 21/43615
USPC .................................... 725/40, 140
See application file for complete search history.

(56) References Cited

U.S. PATENT DOCUMENTS

| | | | |
|---|---|---|---|
| 6,353,174 B1 * | 3/2002 | Schmidt et al. | 84/609 |
| 6,898,637 B2 * | 5/2005 | Curtin | 709/231 |
| 6,953,887 B2 * | 10/2005 | Nagashima et al. | 84/645 |
| 6,975,995 B2 | 12/2005 | Kim | |
| 7,297,858 B2 * | 11/2007 | Paepcke | 84/609 |
| 7,405,355 B2 * | 7/2008 | Both et al. | 84/645 |
| 7,511,215 B2 * | 3/2009 | Bicker | 84/645 |
| 7,518,051 B2 * | 4/2009 | Redmann | 84/601 |
| 8,013,232 B2 * | 9/2011 | Hara | 84/645 |
| 2002/0165921 A1 * | 11/2002 | Sapieyevski | 709/204 |
| 2002/0186233 A1 * | 12/2002 | Holtz et al. | 345/716 |
| 2006/0196343 A1 | 9/2006 | Yung | |
| 2006/0283310 A1 | 12/2006 | Bicker | |
| 2007/0089151 A1 * | 4/2007 | Moore et al. | 725/132 |
| 2007/0261535 A1 | 11/2007 | Sherwani et al. | |
| 2008/0190271 A1 * | 8/2008 | Taub et al. | 84/645 |
| 2008/0201424 A1 * | 8/2008 | Darcie | 709/204 |
| 2009/0106429 A1 * | 4/2009 | Siegal et al. | 709/227 |
| 2009/0113022 A1 * | 4/2009 | Quoc et al. | 709/218 |
| 2009/0164034 A1 * | 6/2009 | Cohen et al. | 700/94 |
| 2009/0172200 A1 * | 7/2009 | Morrison et al. | 709/248 |

* cited by examiner

*Primary Examiner* — Nicholas Corbo
*Assistant Examiner* — Alexander Q Huerta
(74) *Attorney, Agent, or Firm* — Guntin & Gust, PLC; Joseph P. Hrutka

(57) ABSTRACT

An Internet protocol television (IPTV) system includes a server operable to send a performance guide and a time code over the IPTV system to two or more clients. The server receives a performance from each of the clients over the IPTV system, combines the performances into an overall performance, and sends the overall performance over the IPTV system to the clients.

14 Claims, 4 Drawing Sheets

SYSTEM AND METHOD FOR RECORDING A MULTI-PART PERFORMANCE ON AN INTERNET PROTOCOL TELEVISION NETWORK

FIELD OF THE DISCLOSURE

The present disclosure generally relates to Internet protocol (IP) television networks, and more particularly relates to recording multi-part performances over an IP television system.

BACKGROUND

An individual user of an Internet protocol television (IPTV) network can record locally-generated audio or video content. The audio or video content can be in an analog format or a digital format. When the content is in an analog format, a set-top box or other audio equipment can transform the content into a digital format for storage on a set-top box located at the premises of the user, or on a data server on the IPTV network. Digitally formatted content can be stored directly on the set-top box or on the data server.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

An IPTV network application can be used to facilitate the recording and/or broadcasting of multi-user performances. Such performances can include orchestral or popular music performances, dramatic performances, artistic or dance performances, and other types of performances where synchronization between the multiple performers is desirable. An application can provide timing information and performance guidelines to the participants, and the performers can synchronize their portions of the performance to the provided timing information. Each performer's performance can then be captured in a digital format, combined and synchronized using the timing information, and compiled with the performances of the other performers into a single performance. The performance can be viewed as it is being created, or the performance can be recorded for later viewing.

Figure 1:
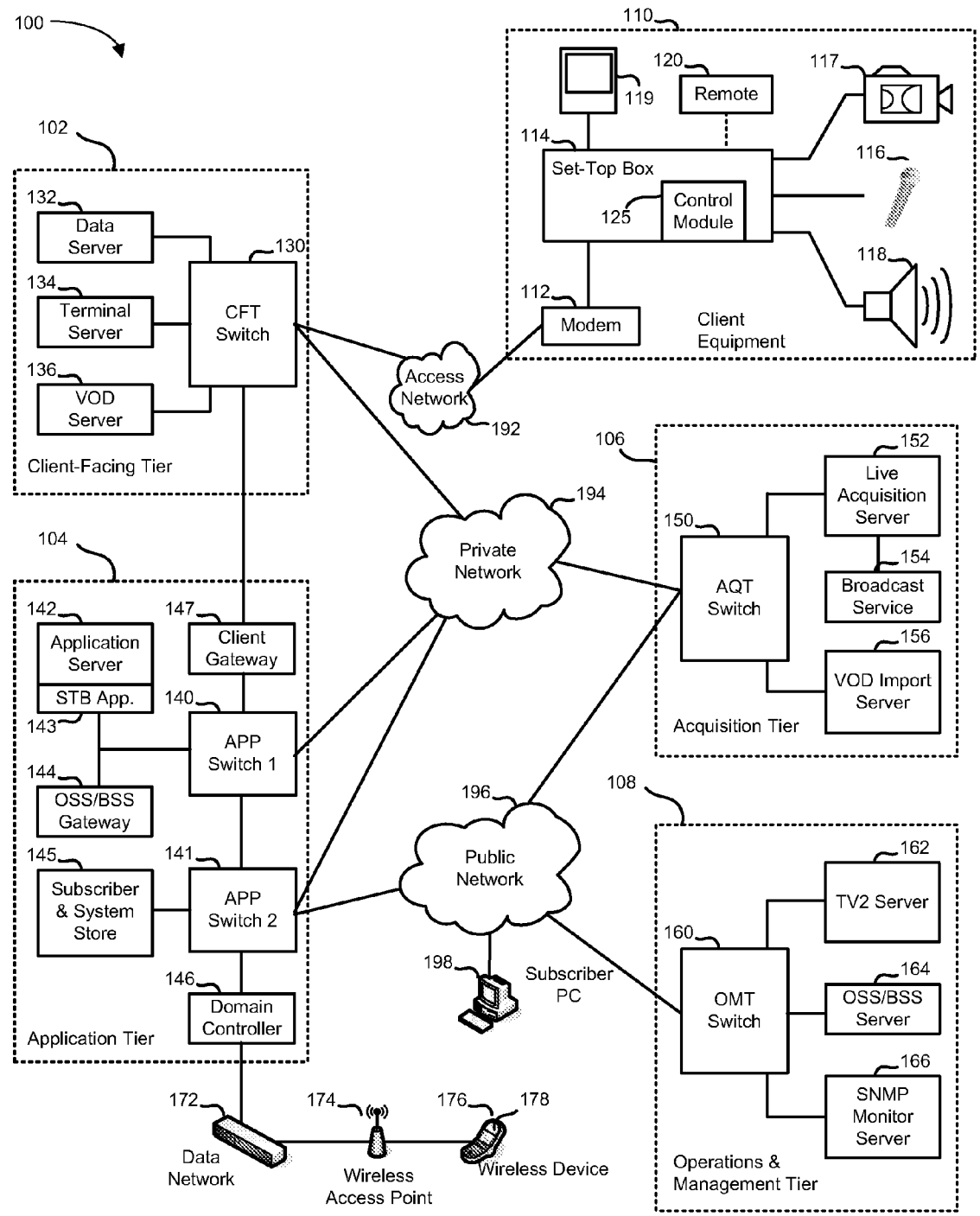
FIG. 1 is a block diagram illustrating an Internet Protocol Television (IPTV) system.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television or audio content, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a video input device 116, an audio input device 117, an audio output device 118, a video display device 119, and a remote control 120. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another transmission network, or any combination thereof.

Audio input 116 receives audio information from the subscriber. The audio information can be in the form of an analog audio signal. Thus, a non-limiting example of an analog audio input 116 includes a microphone, an audio instrument pick-up, or another suitable analog audio input device. Set-top box 114 includes an analog-to-digital converter (not illustrated) to convert the analog audio signal into a digital audio format.

The audio information can also be in the form of a digital signal, such as a musical instrument digital interface (MIDI) file, a waveform audio format (WAV) file, or another suitable digital audio format. A non-limiting example of a digital audio input 116 includes a digital instrument, an audio codec device, or another digital audio input device. In a particular embodiment, audio input 116 includes both analog and digital audio signals. Also, audio input 116 can represent one or more audio input signals, or input channels. Similarly, video input 117 receives video information from the subscriber in the form of analog or digital video signals. A non-limiting example of a digital video input 117 includes a Moving Picture Experts Group (MPEG) file, another digital video format, or another digital video input device. Video input 117 may also refer to an analog video input, a non-limiting example of which is a video camera producing baseband National Television System Committee (NTSC) video. Audio output 118 supplies audio information to the subscriber. In general, audio output 118 represents one or more loudspeakers on one or more separate output channels. Each channel supplies different audio information to each of the loudspeakers, as for example where audio output 118 is a stereo output, a surround sound output, or another suitable audio output. Audio output 118 can also include an analog or digital recording device.

The information that CF tier 102 communicates to modem 112 is sent to set-top box 114, which processes the information into a form suitable for display on video display device 119 and for playback on audio output 118. Further, set-top box 114 sends data to CF tier 102. Such data includes service requests or commands from the subscriber received by set-top box 112 via remote control 120, audio information received from audio input 116, or video information received from video input 117. In this way, the subscriber can request services or information from IPTV system 100, respond to a request for information from IPTV system 100, and upload or stream subscriber generated content to IPTV system 100. Control module 125 includes instructions that are executed by set-top box 114 to control the data flow between the subscriber and IPTV system 100. Control module 125 can include an IPTV software platform such as Microsoft® TV IPTV Edition.

Control module 125 facilitates data communication between set-top box 114 and IPTV system 100. For example, control module 125 includes a procedure whereby set-top box 114 receives a request to record a television program on a digital video recorder (not illustrated), or sends a status to IPTV system 100 that the television program has been recorded. Likewise, control module 125 includes a procedure whereby the subscriber can interact with IPTV system 100 to receive and execute a viewing preference that the subscriber has created in IPTV system 100. Such preferences are created via remote control 120, or through a subscriber account that is accessible through public network 196, such as through a subscriber's personal computer 198. A non-limiting example of remote control 120 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes a first application tier (APP) switch 140, a second application tier (APP) switch 141, an application server 142, an operation systems and support/billing systems and support (OSS/BSS) server 144, a domain controller 146, a subscriber and system store 145, and a client gateway 147. APP switches 140 and 141 manage communication with CF tier 102 and acquisition tier 106 through private network 194. APP switch 141 also manages communication with acquisition tier 106 and OM tier 108 through public network 196. First APP switch 140 is coupled to second APP switch 141. First APP switch 140 is also coupled to application server 142 and to OSS/BSS gateway 144. Application server 142 provides applications to set-top box 114 through a set-top box application 143, so that set-top box 114 can provide functions such as display, messaging, processing of IPTV data and VOD material. OSS/BSS gateway 144 includes operation systems and support (OSS) data, and billing systems and support (BSS) data.

Second APP switch 141 is coupled to domain controller 146 and to subscriber and system store 145. Domain controller 146 provides web access, for example, to subscribers via public network 196. Subscriber and system store 148 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, first APP switch 140, and second APP switch 141. Further, client gateway 147 verifies billing information and status by communicating with OSS/BSS gateway 144 via private network 194 and first APP switch 140. OSS/BSS gateway 144 transmits a query across first APP switch 140, to second APP switch 141, and second APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via second APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the content to video display device 119 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 120, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Figure 2:
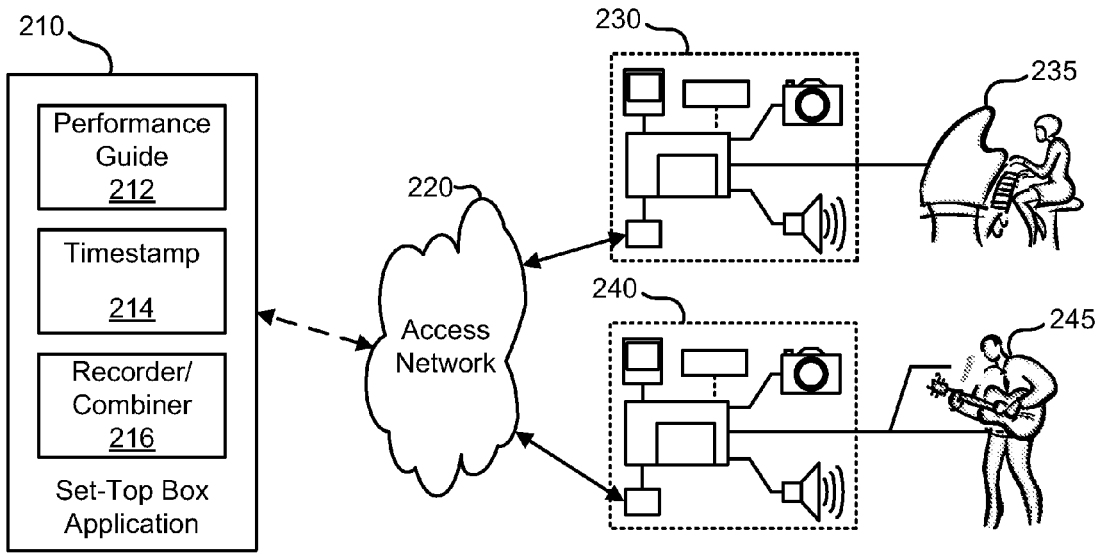
FIG. 2 is a block diagram illustrating an IPTV system for recording a multi-part performance according to an embodiment of the present disclosure.

FIG. 2 shows an embodiment of an IPTV system 200 similar to IPTV system 100. IPTV system 200 includes a set-top box application 210, an access network 220, client equipment 230, and client equipment 240. Set-top box application 210 communicates with client equipment 230 and 240 through access network 220. Set-top box application 210 includes a performance guide 212, time code information 214, and a recorder/combiner 216. Client equipment 230 is configured to communicate with a performer 235, and client equipment 240 is configured to communicate with a performer 245.

Set-top box application 210 sends performance guide 212 and time code information 214 to client equipment 230 and 240. Optionally, set-top box application 210 can send performance guide 212, time code information 214, and one or more previously recorded performances of a mixture of previously-recorded performances. Based upon performance guide 212 and time code information 214, performers 235 and 245 each create an individual performance that includes performance information and time code information. The individual performances are sent by their respective client equipment 230 and 240 to set-top box application 210. Recorder/combiner 216 receives the individual performances and, using the time code information for synchronization, combines the performance information from the individual performances into an overall performance. The overall performance can be sent back to client equipment 230 and 240 for display to performers 235 and 245. The overall performance can also be stored in recorder combiner 216 and made available to other user equipment (not illustrated) in IPTV system 100 or on a public network (not illustrated).

Performance guide 212 may be created by a leader (not illustrated), and stored on set-top box application 210. Performance guide 212 can be created using any of various musical notation methods known within the art, and may include, for example, separate musical scores for various instruments and song lyrics that are associated with the individual performances, and timing and style information and other information related to the overall performance. After reading this specification, the skilled artisan will understand that, although illustrated as musical in nature, the overall performance can include a script for a play or other dramatic performance, choreography instruction for a dance performance, or other information that can be used by performers 235 and 245 to modify or refine their individual performances based upon the type of overall performance desired by the leader. Further, the skilled artisan will recognize that a leader can include a composer, an arranger, a conductor, a director, a choreographer, another type or performance leader, or any combination thereof.

Time code information 214 includes timing information and counting information. The timing information can include a timing pulse time code display such as a metronome signal, a visual timing pulse or other timing information that permits performers 235 and 245 to keep time in their individual performances. The counting information can include a starting point and an index into the performance guide. The counting information may include numbers associated with measures or other timing elements used in music notation. The counting information can be used to permit performers 235 and 245 to know where they are within the overall performance. For example, a musician with a limited part in a musical score can know when their part is coming up by observing the counting information. The counting information can also be used to permit a performer 235 or 245 to record their individual performance at different times, or to correct or improve a segment of their individual performance. The counting information may allow a performer to begin review or recording at a specific point of the performance. For example, a dancer can work to improve a particularly difficult portion of their dance without having to perform the entire individual performance.

Performer 235 and 245 create their individual performances as inputs to their respective client equipment 230 and 240. The individual performances can include audio information, video information, or other multimedia information. In a particular embodiment, client equipment 230 and 240 include an analog-to-digital converter, and the individual performances include analog and digital information. A digital format version of an individual performance is received by client equipment 230 and 240. The digital format version of the individual performances is combined with the timing information and the counting information in the associated client equipment 230 or 240. The individual performances are sent to recorder combiner 216 in set-top box application 210. The individual performances can also be stored on a storage device in the associated client equipment 230 or 240. Note that, while two performers 235 and 245 are illustrated, in a particular embodiment (not illustrated), three or more performers can create individual performances on three or more pieces of associated client equipment, and recorder/combiner 216 can combine the three or more individual performances into an overall performance.

Figure 3:
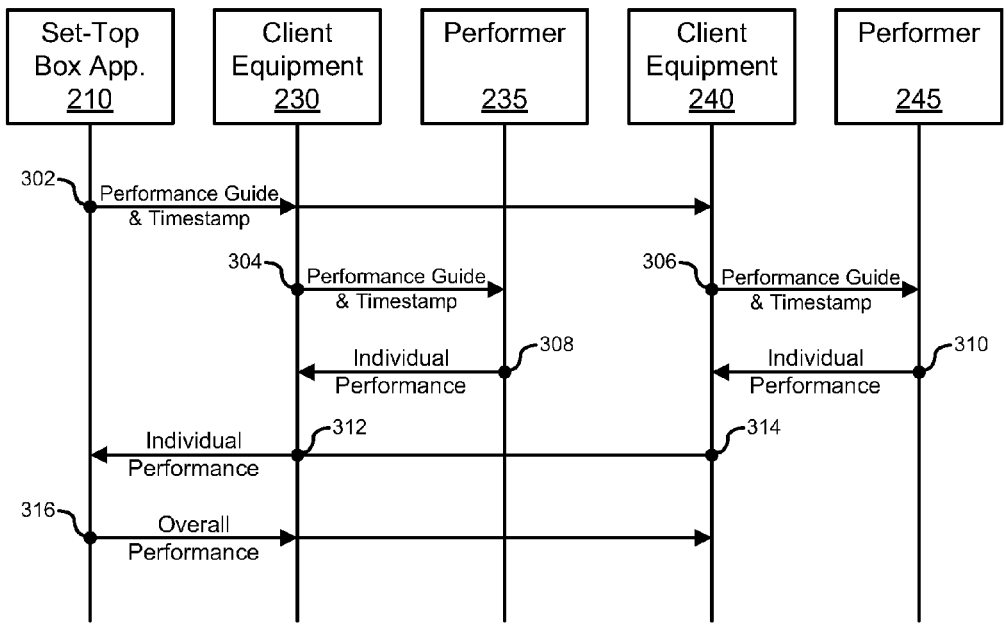
FIG. 3 is a diagram illustrating a method of recording a multi-part performance where the individual performances are created substantially simultaneously in accordance with an embodiment of the present disclosure.

FIG. 3 illustrates a method for recording a multi-part performance according to an embodiment of the present disclosure. Here, the individual performances by performers 235 and 245 are created substantially simultaneously. At 302, set-top box application 210 sends performance guide 212 and time code information 214 to client equipment 230 and client equipment 240. At 304, client equipment 230 displays performance guide 212 and time code information 214 to performer 235. At 306, client equipment 240 displays performance guide 212 and time code information 214 to performer 245. At 308, performer 235 creates an individual performance that is sent to client equipment 230. At substantially the same time, at 310, performer 245 creates an individual performance that is sent to client equipment 240. At 312, client equipment 230 sends performer's 235 individual performance to set-top box application 210, and at substantially the same time, at 314, client equipment 240 sends performer's 245 individual performance to set-top box application 210. Set-top box application 210 receives performers' 235 and 245 individual performances, where recorder/combiner 216 records them and combines them together into an overall performance which is sent, at 316, by set-top box application 210 to client equipment 230 and client equipment 240, where performers 235 and 245 can view and hear the combined performance. In a particular embodiment, performers 235 and 245 can be connected together via a low latency audio connection (not illustrated) such as a telephone line, a voice over Internet protocol (VoIP) connection, or other low latency audio connection, to improve synchronization and the ability to improvise individual performances in near real time.

Figure 4:
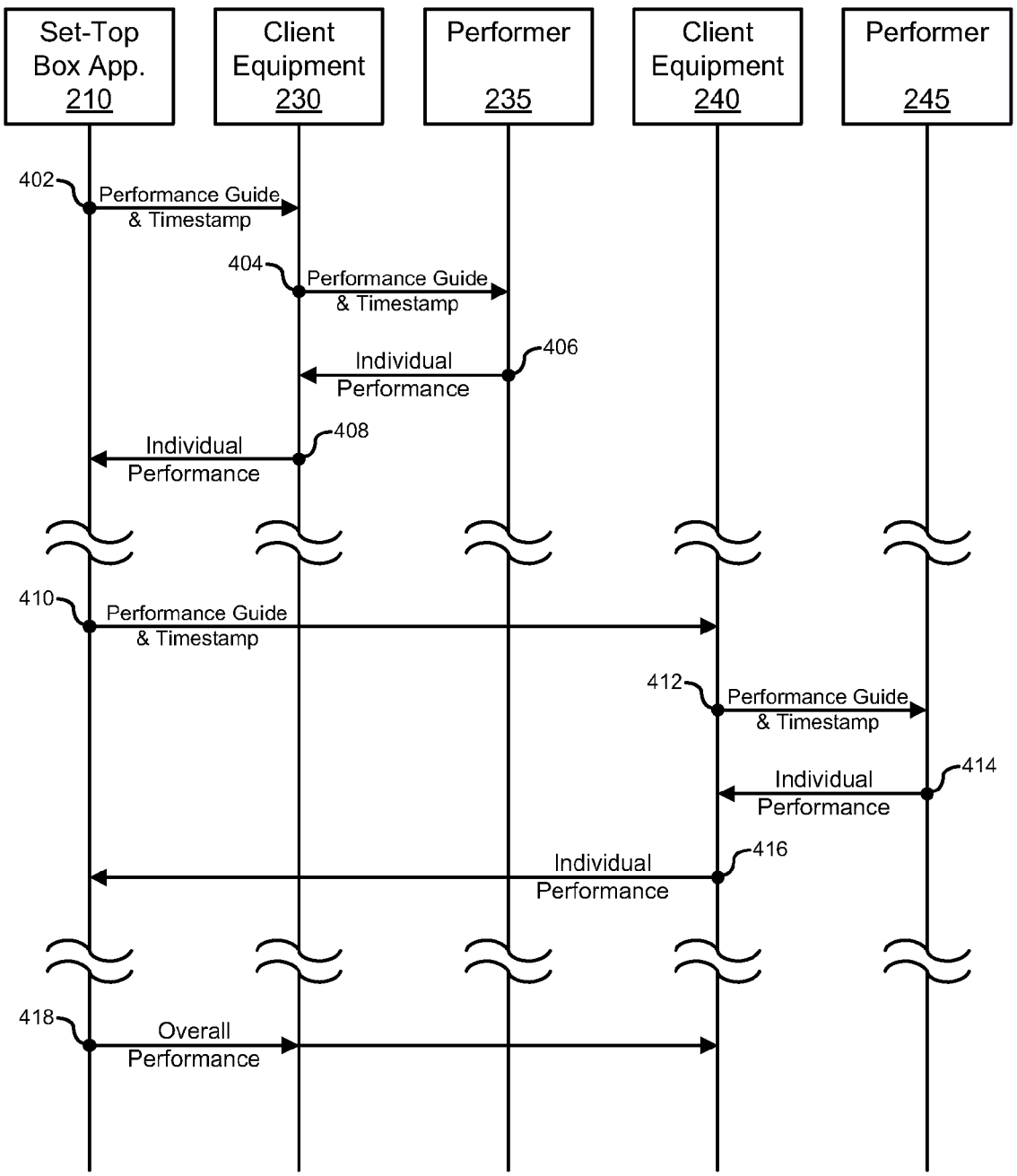
FIG. 4 is a diagram illustrating a method of recording a multi-part performance where the individual performances are created at different times in accordance with an embodiment of the present disclosure.

FIG. 4 illustrates another method for recording a multi-part performance according to an embodiment of the present disclosure. Here, the individual performances by performers 235 and 245 are created at different times. At 402, set-top box application 210 sends performance guide 212 and time code information 214 to client equipment 230. At 404, client equipment 230 displays performance guide 212 and time code information 214 to performer 235. At 408, performer 235 creates an individual performance that is sent to client equipment 230. At 408, client equipment 230 sends performer's 235 individual performance to set-top box application 210. Set-top box application 210 receives performers' 235 individual performance, and recorder/combiner 216 records it.

At a later time, at 410, set-top box application 210 sends performance guide 212 and time code information 214 to client equipment 240. Optionally, set-top box application 210 can send performance guide 212, time code information 214, and one or more previously recorded performances of a mixture of previously-recorded performances. At 412, client equipment 240 displays performance guide 212 and time code information 214 to performer 245. At 414, performer 245 creates an individual performance that is sent to client equipment 240. At 416, client equipment 240 sends performer's 245 individual performance to set-top box application 210. Set-top box application 210 receives performers' 235 individual performance, and recorder/combiner 216 records it, and combines it with performer's 235 individual performance to make an overall performance. At a later time, at 418, set-top box application 210 send the overall performance to client equipment 230 and client equipment 240, where performers 235 and 245 can view and hear the combined performance. In another embodiment (not illustrated), set-top box application 210 sends the overall performance to client equipment 230 and client equipment 240 at different times, and performers 235 and 245 can view and hear the overall performance at different times. In yet another embodiment, two or more individual performances are created substantially simultaneously as illustrated in FIG. 3, and one or more additional individual performances are created at different times as illustrated in FIG. 4.

In a particular embodiment, performance guide 212 includes queues for switching a primary video input from a particular performer 235 to another performer 245. In this way, a leader can maintain control of the visual features of the overall performance. For example, when a guitarist is expected to have a solo, the performance guide can queue the video feed from the guitarist's video input so that, in the overall performance, the guitarist is viewed during the solo. In another embodiment, the overall performance can include video information from each of the performers, and the video portion of the overall performance can be viewer selectable.

Figure 5:
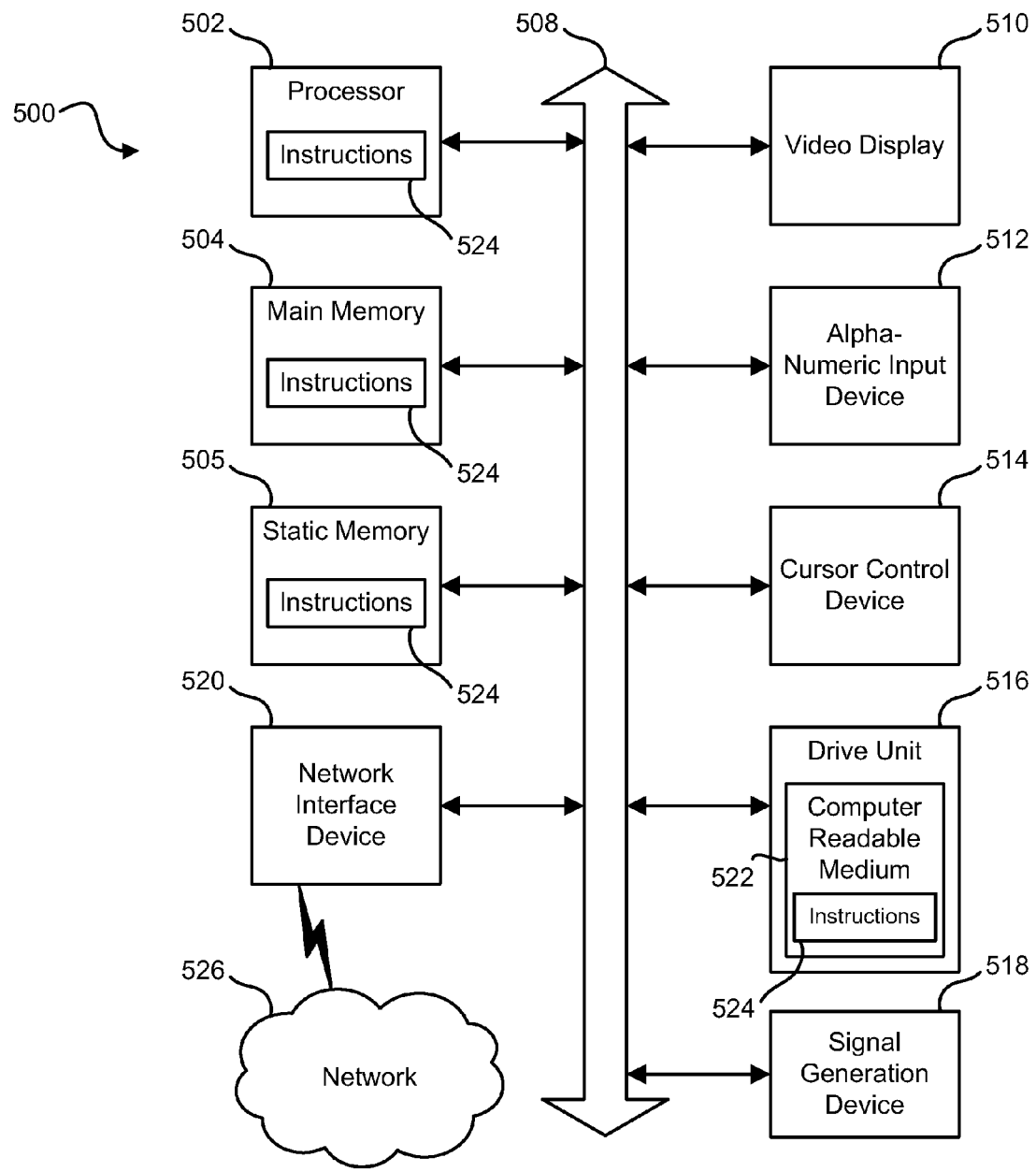
FIG. 5 shows an illustrative embodiment of a general computer system in accordance with at least one embodiment of the present disclosure.

FIG. 5 shows an illustrative embodiment of a general computer system 500 in accordance with at least one embodiment of the present disclosure. Computer system 500 includes a set of instructions that can be executed to cause computer system 500 to perform any one or more of the methods or computer based functions disclosed herein. Computer system 500 can operate as a standalone device or can be connected via a network to other computer systems or peripheral devices.

In a networked deployment, computer system 500 operates in the capacity of a server or as a client computer in a server-client network environment, or as a peer computer system in a peer-to-peer (or distributed) network environment. Computer system 500 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 500 is implemented using electronic devices that provide voice, video or data communication. Further, while computer system 500 is illustrated as a single system, the term "system" shall also be taken to include any collection of systems or sub-systems that individually or jointly execute a set, or multiple sets, of instructions to perform one or more computer functions.

Computer system 500 includes a processor 502 such as a central processing unit (CPU), a graphics processing unit (GPU), or both. Moreover, computer system 500 includes a main memory 504 and a static memory 506 that communicate with each other via a bus 508. Computer system 500 further includes a video display unit 510, such as a liquid crystal display (LCD), an organic light emitting diode (OLED), a flat panel display, a solid state display, or a cathode ray tube (CRT). Additionally, computer system 500 includes an input device 512, such as a keyboard, and a cursor control device 514, such as a mouse. Computer system 500 also includes a disk drive unit 516, a signal generation device 518, such as a speaker, a remote control, an audio input or output device, or a combination thereof, and a network interface device 520.

In a particular embodiment, disk drive unit 516 includes a computer-readable medium 522 in which one or more sets of instructions 524 are embedded. Instructions 524 embody one or more of the methods or logic as described herein. In a particular embodiment, instructions 524 reside completely, or at least partially, within main memory 504, static memory 506, and/or within processor 502 during execution by computer system 500. Main memory 504 and processor 502 also include computer-readable media. Network interface device 520 provides connectivity to a network 526 such as a wide area network (WAN), a local area network (LAN), or other network. The present disclosure contemplates a computer-readable medium that includes instructions 524 or receives and executes instructions 524 responsive to a propagated signal, so that a device connected to network 526 can communicate voice, video or data over network 526. Further, instructions 524 can be transmitted or received by network 526 via network interface device 520.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
a processor; and
a memory that stores executable instructions that, when executed by the processor, facilitate performance of operations, comprising:
sending a performance guide over a television network to a first set-top box device of a first client and to a second client device of a second client, the performance guide comprising information that is readable, wherein the first set-top box device presents, at a first display device, a first media program of the performance guide received from the television network, wherein the performance guide further comprises a queue;
sending a time code over the television network to the first set-top box device and to the second client device, wherein the time code is associated with the performance guide, wherein the time code comprises timing information and counting information, wherein the timing information comprises a timing pulse display, wherein the counting information comprises a starting point and an index of the performance guide, wherein the timing pulse display allows both of the first set-top box device and the second client device to keep time during a each of a first performance of the first client or a second performance of the second client;

receiving first content from the first set-top box device and second content from the second client device, wherein the first content comprises the first performance by the first client that is captured at the first set-top box device, wherein the second content comprises the second performance by the second client that is captured at the second client device, wherein the queue comprises instructions to instruct the first set-top box to record first video information at a first set of predetermined times as part of the first content and to instruct the second client device to record second video information at second set of predetermined times as part of the second content, and wherein the first content and second content are captured at different times;

generating an overall performance content based on the first content and the second content; and sending the overall performance content over the internet protocol television network to one of the first set-top box device, the second client device, or a combination thereof.

2. The system of claim 1, wherein the timing pulse display comprises one of a metronome signal or a visual timing pulse, wherein the timing pulse display is associated with both of the first content from the first set-top box device and the second content from the second client device.

3. The system of claim 1, wherein the performance guide is sent to the first set-top box device and the second client device with previously recorded content capturing a third performance by a third client, wherein the overall performance content includes the third performance.

4. The system of claim 1, wherein the processor further performs operations comprising:

sending the performance guide over the television network to a third set-top box device;

sending the time code over the television network to the third set-top box device;

receiving third content that captures a third performance as third content from a third client associated with the third set-top box device, wherein queue further comprises instructions to instruct the third set-top box to record third video information at a third set of predetermined times as part of the third content; and combining the third content with the first content and the second content into the overall performance content according to the queue.

5. A machine-executable code embedded within a non-transitory medium and including instructions that, when executed by a processor, facilitate performance of operations comprising:

sending a performance guide to a first set-top box device and to a second client device, the performance guide comprising information that is readable, wherein the performance guide further comprises a queue, wherein the first set-top box device is associated with a first client, wherein the second client device is associated with a second client, and wherein the first set-top box device presents, at a first display device, a first media program received from a television network;

sending a time code to the first set-top box device and to the second client device; wherein the time code comprises a timing pulse display and counting information, wherein the counting information comprises a starting point and an index of the performance guide, and wherein the counting information describes a position of the respective one of a first performance of the first client and the second performance of the second client;

receiving first content comprising a first performance of the first client that is captured at the first set-top box device and second content comprising a second performance of the second client that is captured at the second client device, wherein the queue comprises instructions to instruct the first set-top box to record first video information at a first set of predetermined times as part of the first content and to instruct the second client device to record second video information at second set of predetermined times as part of the second content, wherein the first content and the second content are captured without sending any previously captured performance content to the first set-top box device or the second client device, and wherein the first content and the second content are captured at different times;

generating an overall performance content based on the first performance and the second performance; and sending the overall performance content to the first set-top box device.

6. The machine-executable code of claim 5, wherein the processor further performs operations comprising sending the overall performance content to the second client device.

7. The machine-executable code of claim 5, wherein the first content includes corrected content for a portion of the first performance that is reviewed and corrected by the first client prior to the receiving of the first content.

8. The machine-executable code of claim 7, wherein the performance guide and the time code are sent to the first set-top box device and the second client device without sending performance content.

9. The machine-executable code of claim 5, wherein the processor further performs operations comprising:

sending the performance guide to a third set-top box device;

sending the time code to the third set-top box device;

receiving third content that captures a third performance as third content from a third client associated with the third set-top box device, wherein queue further comprises instructions to instruct the third set-top box to record third video information at a third set of predetermined times as part of the third content; and combining the third performance with the first and second performances into the overall performance content.

10. The machine-executable code of claim 5, wherein the timing pulse display allows both of the first set-top box device and the second client device to keep time during a respective one of the first performance or the second performance.

11. A method comprising:

sending, by a system comprising a processor, a performance guide to create overall performance content over a network to a first set-top box device and to a second client device, the performance guide comprising information that is readable, wherein the first set-top box device is associated with a first client, wherein the second client device is associated with a second client, wherein the first set-top box device presents, at a first display device, a first media program received from the network, and wherein the performance guide further comprises a queue;

sending, by the system, a time code over the network to the first set-top box device and to the second client device, wherein the time code comprises a timing pulse display and counting information, wherein the counting information comprises a starting point and an index of the performance guide, wherein the timing pulse display allows both of the first set-top box device and the second client device to keep time in each of a first performance of the first client or a second performance of the second client, and wherein the counting information describes a position of the respective one of a first performance of the first client and the second performance of the second client in the overall performance content;

receiving, by the system, first content comprising a first performance of the first client that is captured at the first set-top box device and second content comprising a second performance of the second client that is captured at the second client device, wherein the first content and the second content are captured without sending any previously captured performance content to the first set-top box device or the second client device, and wherein the first content and the second content are captured at different times;

generating by a server an overall performance content based on the first content, the second content; and sending the overall performance content over the network to the first set-top box device.

12. The method of claim 11, wherein the first content includes corrected content for a portion of the first performance that is reviewed and corrected by the first client prior to the receiving of the first content.

13. The method of claim 12, wherein the performance guide and the time code are sent to the first set-top box device and the second client device without sending performance content.

14. The method of claim 12, wherein the queue comprises instructions to instruct the first set-top box to record first video information at a first set of predetermined times as part of the first content and to instruct the second client device to record second video information at second set of predetermined times as part of the second content.

* * * * *